Nov. 7, 1933.  A. APEL  1,933,535
HARVESTER
Filed May 13, 1932
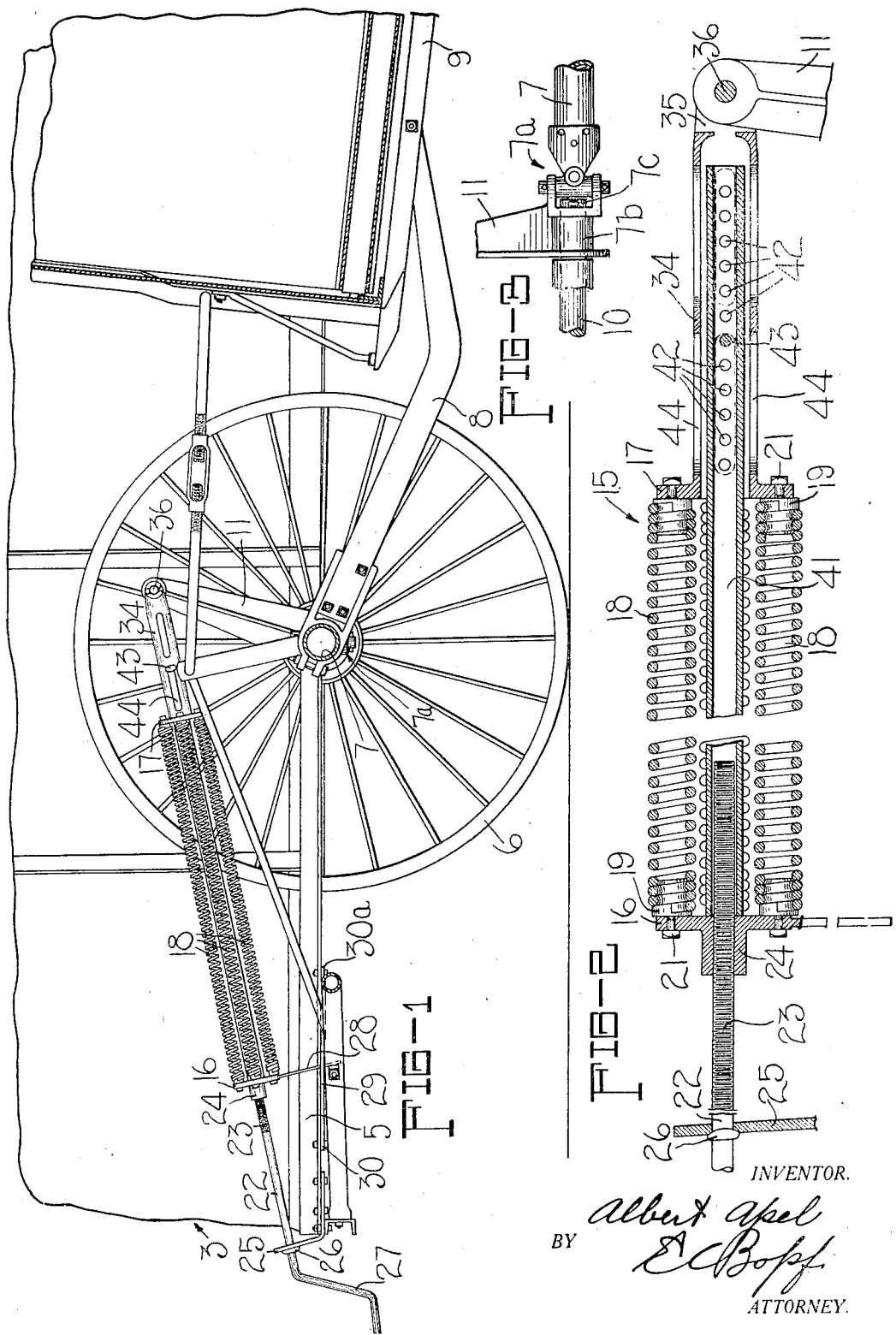
INVENTOR.
Albert Apel
BY
ATTORNEY.

Patented Nov. 7, 1933

1,933,535

UNITED STATES PATENT OFFICE 1,933,535

HARVESTER

Albert Apel, Moline, Ill., assignor to Deere & Company, Moline, Ill., a corporation of Illinois Application May 13, 1932. Serial No. 611,222

7 Claims. (Cl. 56—20)

My invention relates generally to spring counterbalancing mechanisms, such as are commonly used on harvester threshers, windrow harvesters and like implements to counterbalance the weight of the harvesting platform, and pertains more particularly to a means for locking the mechanism in a tensioned position to facilitate the disconnection of the harvesting platform from the main frame of the implement.

When implements of this kind are to be transported on a highway, the harvesting platform is usually removed from its laterally extending operating position relative to the implement and is carried on a transport truck trailed at the rear of the implement. It has been necessary to relieve the counterbalancing springs of all tension before the platform could be detached from the main frame of the implement, and since these springs are usually relatively long, it requires considerable time and effort to completely release all the tension of the springs.

The object of my invention is to provide a means for locking the counterbalancing mechanism in a tensioned position so as to make it unnecessary to release all the tension preparatory to disconnecting the harvesting platform for transport.

Other objects and advantages of my invention will be apparent to those skilled in the art after a consideration of the following detailed description, taken in conjunction with the accompanying drawing wherein:

Figure 1 is a fragmentary view of a harvester thresher with my improved counterbalancing mechanism mounted thereon. The harvester thresher is shown in section, the section plane passing through the center of the harvesting platform;

Figure 2 is an enlarged detail view of the counterbalancing mechanism shown in longitudinal section; and, Figure 3 is a fragmentary view of the connection of the inner end of the harvesting platform supporting member with the main frame of the thresher.

I have chosen to illustrate my invention as applied to a harvester thresher of a type, well known in the art, comprising a threshing unit 3 having a main frame 5 which is carried on a transverse axle 10 supported on two wheels 6. A transversely extending pipe member 7 is supported by a wheel (not shown) on its outer end. At its inner end member 7 is connected by means of a universal coupling 7a to a sleeve 7b, which in turn is swivelly connected to the extended end 7c of thresher axle 10. Supporting arms 8 are secured on member 7 and extend forwardly to support the harvesting platform 9.

A counterbalancing mechanism 15, with which my invention is particularly concerned, is connected between an arm 11 secured to sleeve 7b and extending upwardly therefrom, and main frame 5 to balance the weight of the platform 9. The mechanism 15 comprises head members 16 and 17 between which is disposed a plurality of tension springs 18. The springs 18 are attached to heads 16 and 17 by means of attaching blocks 19 which are spaced around the inner face of heads 16 and 17 and are secured thereto by bolts 21. Threads are formed on the outer surface of blocks 19 so that the blocks may be screwed into the ends of springs 18 to anchor the springs thereto.

The springs 18 are under tension and the degree of tension may be varied in accordance with the weight of platform 9. To facilitate the variation of tension in springs 18 an adjusting rod crank screw 22 is provided having a threaded portion 23 which is screwed into a threaded boring in the center of head 16. The rear end of rod 22 is supported in a bracket 25 secured on the main frame 5. An enlargement 26 is provided on rod 22 to engage with the rear face of bracket 25. A crank handle 27 is formed on the end of rod 22 to facilitate turning of the rod to adjust the tension of springs 18.

When adjusting rod 22 is turned to adjust the tension of springs 18, head 16 tends to rotate therewith and to prevent this rotation a finger 28 is provided on head 16 which extends downwardly into a guideway formed between frame 5 and a rod 29. The ends of rod 29 are bent at right angles at 30 and 30a and are bolted or otherwise secured to frame member 5.

The forward end of counterbalancing mechanism 15 is connected to arm 11 by means of a sleeve 34 formed integral with head 17. The forward end of sleeve 34 is bifurcated at 35 and embraces the upper end of arm 11. A pivot pin 36 extends through aligned holes in arm 11 and the bifurcated end of sleeve 34.

In order that the counterbalancing mechanism may be locked in a tensioned position, I have provided a locking means comprising a tubular member 41 disposed inside of sleeve 34 and extending rearwardly and abutting the front face of head 16. Tubular member 41 is of sufficient diameter to slide freely over end 23 of adjusting rod 22. A plurality of holes 42 are provided in the opposite end of member 41 and are adapted to receive a pin 43. Pin 43 is long enough to extend through transversely aligned slots 44 provided in sleeve 34. To lock the mechanism in a tensioned position, it is merely necessary to insert pin 43 into the hole 42 adjacent the front ends of slots 44, and then turn crank 27 to release the tension until pin 43 bears against the ends of slots 44. This converts the mechanism into a rigid unit. It may now be disconnected from arm 11 without further reduction of the tension of springs 18.

If springs 18 are extended a considerable distance so that the foremost one of holes 42 is not in close proximity to the end of rear slot 44, pin 43 may be positioned in the hole 42 adjacent the inner face of head 17 and permitted to contact therewith.

When the harvester thresher is to be transported on a highway, the harvesting platform 9 is removed from its operating position beside the thresher and is mounted on a transport truck (not shown) adapted to be trailed behind the thresher. The procedure in disconnecting the harvester platform 9 from the thresher is as follows: The platform 9 is first raised, through the actuation of the lifting lever, to permit placing a transport truck underneath it. After the truck is in place, the platform 9 is lowered until it is resting on the truck. Then the pin 43 is inserted in the hole 42 adjacent the front end of slots 44 and the tension of springs 18 is released until pin 43 bears against the end of slots 44. Since the platform 9 is resting on the transport truck, pipe member 7 may now be disconnected from sleeve 7b by removing one of the pins connecting the parts of the universal coupling 7a. An additional turn or two of crank 27 may be necessary to relieve the pressure on the coupling. The remaining connections of the platform with the thresher frame may now be disconnected. Without the locking means which I have provided for locking the springs in a tensioned position, it would be necessary to relieve all the tension of the springs before pipe member 7 could be removed. By the employment thereof, considerable time and effort necessary to do this in the operation of disconnecting the harvesting platform from the thresher is saved.

To reconnect the harvester platform with the thresher for operation, the above procedure is reversed. After the pipe member 7 has been replaced and the other connections made, it is merely necessary to turn the crank 27 sufficiently to release the pressure upon pin 43 whereupon it may be withdrawn. If the tension of springs 18 were totally relieved, it would of course be necessary to re-tension them. Since by the use of my locking device, the tension of springs 18 is not relieved, the time and effort which would otherwise be necessary to re-tension the springs, upon reconnecting the harvesting platform, is saved. Thus my improved counterbalancing mechanism saves time and effort in reconnecting the harvesting platform to the thresher as well as in disconnecting from the thresher.

While I have described, in connection with the accompanying drawing, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. The combination with a counterbalancing mechanism comprising a pair of heads, spring means tending to draw said heads together, and means inserted between said heads optionally made effective to hold said heads separated against the tension of said spring means.

2. A counterbalancing mechanism of the class described comprising a pair of heads, spring means tending to cause relative movement of said heads in one direction, and means positioned between said heads and optionally made effective to hold said heads in a given spaced relationship against the action of said spring means.

3. A counterbalancing mechanism of the class described comprising a pair of heads, tension spring means tending to draw said heads together, means disposed between said heads and engaging one of said heads and having telescopic engagement with the other head, and means for optionally locking said last means against telescopic movement relative to said other head whereby said heads are held separated against the tension of said spring means.

4. The combination with a counterbalancing mechanism comprising a pair of heads and a plurality of springs connecting said heads of a sleeve secured to one head, a member slidably supported in said sleeve and abutting the other head member, and means adapted to lock said member to said sleeve to hold said heads in spaced relation against the tension of said springs.

5. The combination with a counterbalancing mechanism comprising a pair of heads and a plurality of springs connecting said heads, of a sleeve secured to one head, transversely aligned slots in the sleeve, a member slidably supported in said sleeve and abutting the other head, a plurality of holes in one end of said member, and a pin adapted to be inserted through said slots and one of said holes to lock said heads in spaced relation against the tension of said springs.

6. In combination with a counterbalancing mechanism comprising a front head, a rear head, and plurality of tension springs connecting said heads, of a sleeve having transverse aligned openings therein secured to said front head, an adjusting rod screwed into a threaded boring in said rear head and extending into the space between said springs, a tubular member having its forward end supported in said sleeve and its rear end embracing the extended end of said adjusting rod and abutting the inner face of the rear head, a plurality of aligned openings in said tubular member, and a pin adapted to be inserted through the openings in said sleeve and said tubular member to hold said heads separated against the tension of said springs.

7. A counterbalancing mechanism of the class described comprising a pair of heads, the first head having a longitudinal threaded boring therein, an adjusting crank screw threaded in said boring, tension spring means connecting said heads, and means for optionally holding said heads in a given spaced relationship against the action of said springs comprising a tubular member having one end embracing the end of said crank screw extending through the first head, and abutting the inner face of the first head, and means for establishing a connection between the other end of said member and the second head.

ALBERT APEL.